United States Patent

[15] 3,639,743

Kitz

[45] Feb. 1, 1972

[54] CALCULATING MACHINE WITH KEY-CONTROLLED GATES SETTING FUNCTION COUNTER STATES

[72] Inventor: Norbert Kitz, Uxbridge, Middlesex, England

[73] Assignee: Bell Punch Company Limited, London, England

[22] Filed: July 29, 1969

[21] Appl. No.: 845,831

[52] U.S. Cl. ........................................................... 235/160
[51] Int. Cl. ......................................................... G06f 7/48
[58] Field of Search .............. 235/160, 145; 340/365; 178/80

[56] References Cited

UNITED STATES PATENTS 3,291,910  12/1966  Nicklas et al. .................... 178/79 X
3,330,946  7/1967   Scuitto .............................. 235/160

*Primary Examiner*—Eugene G. Botz
*Assistant Examiner*—David H. Malzahn
*Attorney*—Laurence R. Brown

[57] ABSTRACT

Key-controlled electronic calculating apparatus has a function state counter controlling various arithmetic calculations. The states are established by function keys gating signals to set the counter into predetermined states. Each function key produces a signal of predetermined duration that may comprise a sequence of pulses. The counter states may be controlled by feedback gating signals from a previous counter state.

12 Claims, 4 Drawing Figures

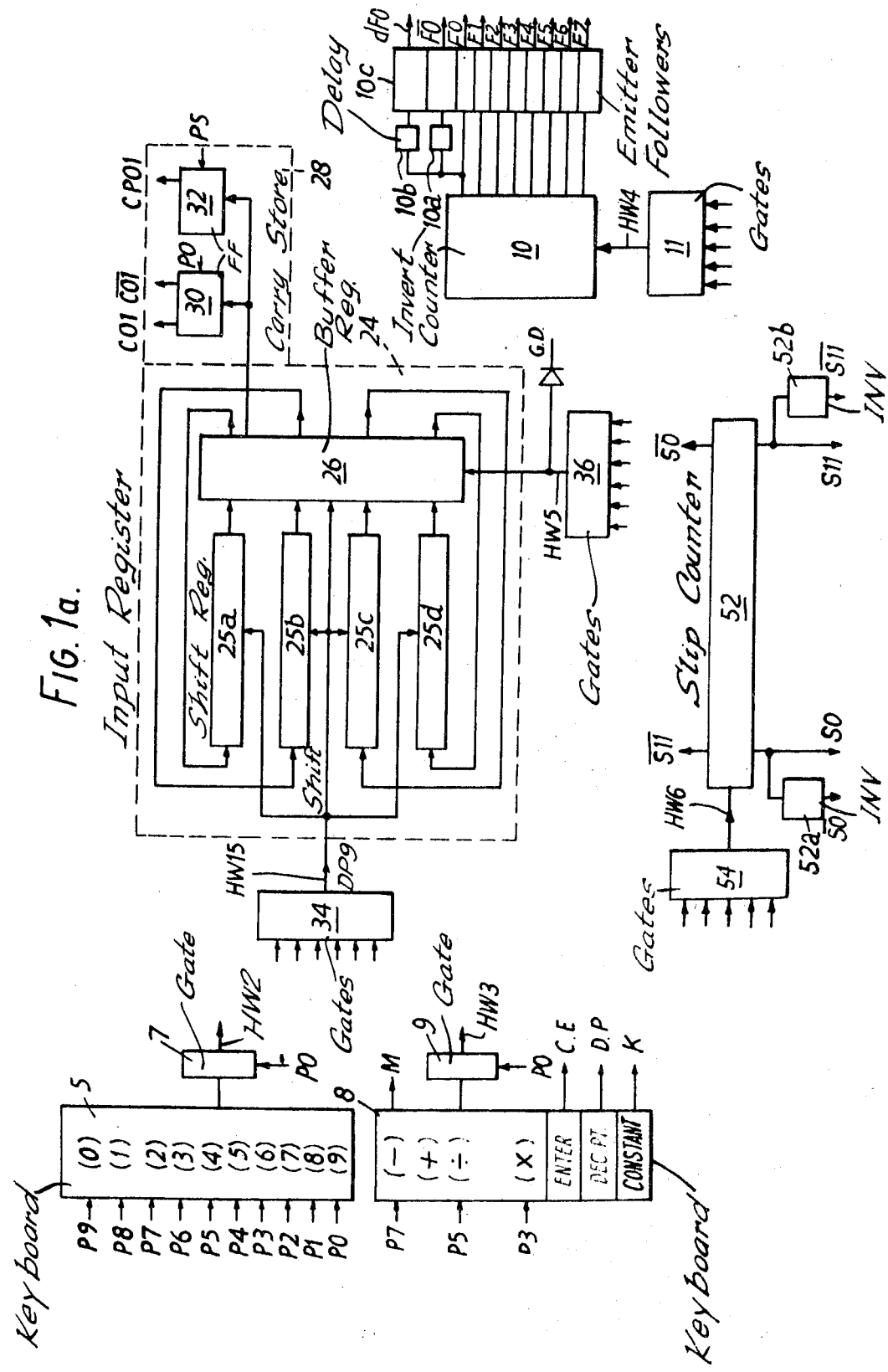

CALCULATING MACHINE WITH KEY-CONTROLLED GATES SETTING FUNCTION COUNTER STATES

This invention has reference to calculating machines and has particular reference to an apparatus for controlling the function state of the calculating machine by means of keyboard-controlled gates. Such calculating machines have a function keyboard which has function keys corresponding with the functions or program operations which are possible on the calculating machine. Depression of a function key initiates the generation of an electrical signal which is unique to that function and which is used to control the function gating circuits used by the calculating machine to perform that function. The electric signal whose generation is initiated by the depressed function key may be a train of pulses of predetermined number and/or predetermined period in time or may be a single pulse generated along a line connected between the function key and those function gating circuits controlled by the function key. Depression of the digit keys on the digit keyboard of such a calculating machine also initiates functions or programs which are also controlled by the apparatus and which are concerned with the entry of the digit number corresponding to the depressed digit keys into a register of the calculating machine.

An object of the invention is to provide an improved calculating machine.

A further object of the invention is to provide an apparatus for controlling the function state of a calculating machine by gating into a state counter pulses controlled by a function keyboard.

According to the invention there is provided a calculating machine similar to that of my copending U.S. application Ser. No. 845,811 filed July 29, 1969, having an apparatus for controlling by a keyboard function circuits of the calculating machine, said apparatus including a counter circuit whose input is connected to a source of function pulses controlled by function keys and/or digit keys and whose outputs from the count states are connected to the function circuits.

A constructional embodiment made in accordance with the invention will now be described, by way of example with reference to the accompanying drawings wherein:

FIGS. 1 and 1a show a block diagram of part of an electronic calculating machine made according to the invention;

Figure 1:
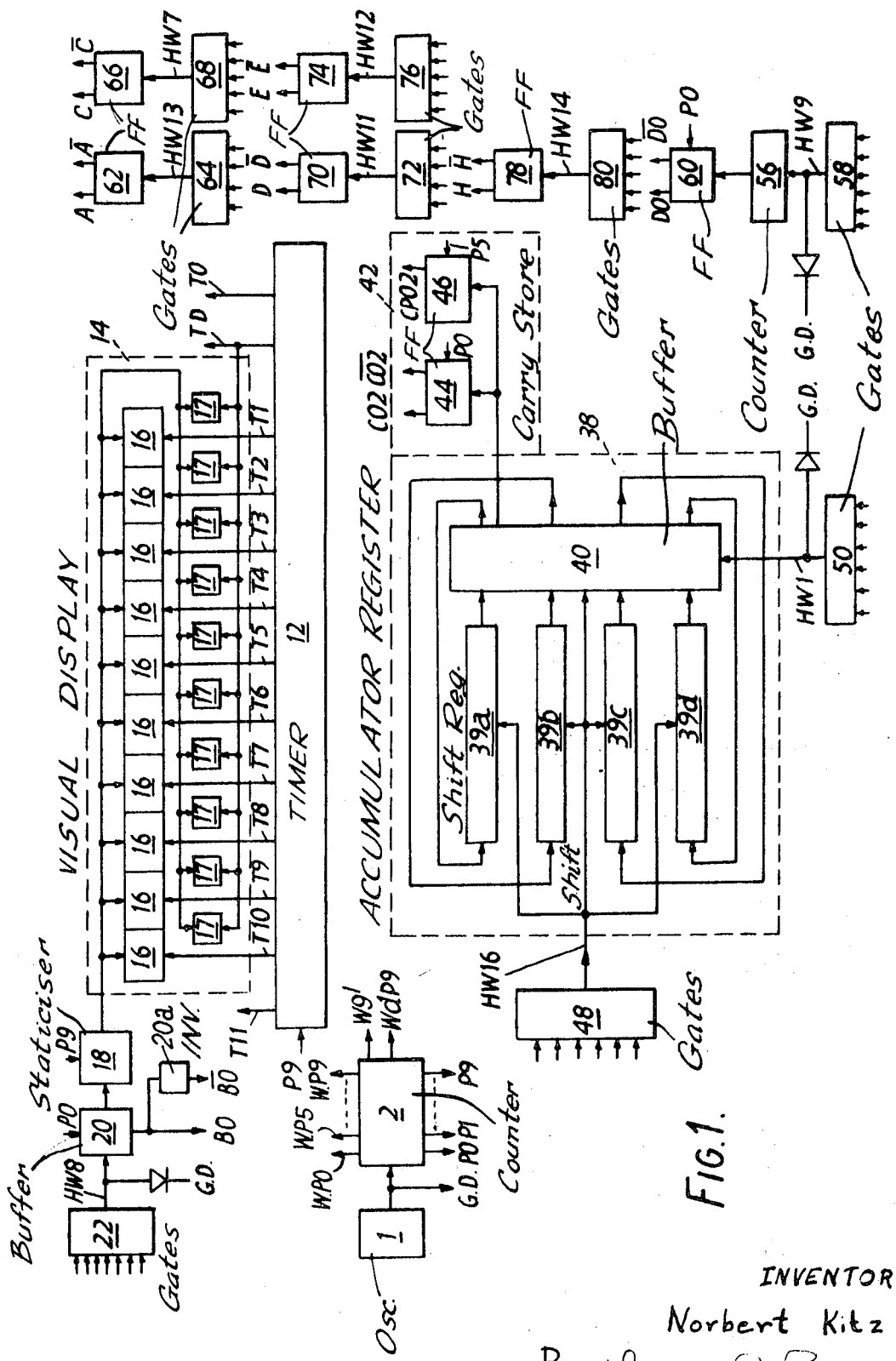

The FIG. 1 shows an electronic calculating machine made according to the present invention. In FIG. 1 a master oscillator 1 generates free-running oscillator pulses GD which are on' at +12v. and 'off' at 0 v. The oscillator 1 is connected to an input decade 2 which is connected as a Johnson ring circuit. The input decade 2 divides the master oscillator pulses GD into sequential groups of ten pulses, viz P0, P1, P2, P3, P4, P5, P6, P7, P8 and P9.

The output pulses P0 to P9 from the input decade 2 are internally gated to give waveforms P0, P5 and P9, a waveform $9^1$, and a waveform dP9.

"Waveform P0" is up (at +12 v.) from the back edge of the P9 pulse to the back edge of the P0 pulse.

"Waveform P5" is up from the back edge of P4 pulses to the back edge of P5 pulse.

"Waveform P9" is up from the back edge of P8 pulse to the back edge of P9 pulse.

"Waveform $9^1$," is up from the back edge of P0 pulse to the back edge of P9 pulse.

"Waveform dP9" is up from the back edge of P9 pulse to the front edge of P0 pulse.

The calculating machine has a digit keyboard 5 having 10 normally open digit key switches (not shown) representing the digits 0–9 respectively, which switches are closed when the corresponding keys (not shown) are depressed. The normally open contact of the digit key switches (not shown) representing the digits 0–9 respectively are connected to the pulses P0 to P9 respectively and the connections to the movable contact of the digit key switches are connected to a digit gate circuit 7 which has an output to a digit highway HW2. The digit gate circuit 7 is reset by a pulse P0. When a digit key (not shown) is depressed to close the corresponding digit key switch, a digit signal of a train of pulses of number equal to the digit corresponding to the digit key depressed is repetitively transmitted along the digit highway HW2 until the depressed digit key is released.

The calculating machine also has a function keyboard 8 which has function key switches (not shown) marked with the following symbols "+," "−," "×," ",", "decimal point," "constant," and "enter." The function key switches (not shown) marked "+," "−," "×," and "," which control the arithmetical functions of addition, subtraction, multiplication and division respectively, are similar to the digit key switches and are connected in a similar way to a function gate circuit 9. The output from the function gate circuit 9 is connected to a function highway HW3. The function gate circuit 9 is reset by a pulse P0. When a function key is closed by depression of the function key, the corresponding function signal is repetitively transmitted along the highway HW3. The four function signals transmitted along function highway HW3 are:

on depression of the "+" key, up at the back edge of P7, down at the back edge of P0;

on depression of the "−" key, up at the back edge of P7, down at the back edge of P0;

on depression of the "×" key, up at the back edge of P3, down at the back edge of P0;

on depression of the "" key, up at the back edge of P5, down at the back edge of P0.

The minus key also puts out a "minus" signal M to the logic gates.

The entry key transmits a "CE" signal along the line C.E., when the entry key is depressed. The decimal point key transmits a "DP" signal along the line D.P., when the decimal point key is depressed; and the constant transmits a constant signal "K" along the line K, when the constant key is depressed.

A function counter circuit 10 is a decade counter internally interconnected so as to have eight count states so that the counter circuit will sequentially count up to eight. An output is connected to a respective count state and the eight count state outputs are labeled in order of ascending count state as the function positions F0, F1, F2, F3, F4, F5, F6 and F7 respectively. The function position F0 is connected to an INVERTER circuit 10a to give an output F̄0. The function position F0 is also connected to a delay circuit 10b to give an output dF0 which comes up at the back edge of the pulse from the function position F0 and goes down after a time delay set by the delay circuit 10b. The input of the function counter circuit 10 is connected by a highway HW4 to a first set of gates 11 which are described in detail later. The outputs of the function positions F0 to F7, F̄0, and dF0 are connected to the input of a buffer circuit in the form of an emitter follower respectively of a group of 10 emitter followers which are shown as the rectangles 10c in FIG. 1a. The outputs of the respective emitter followers are connected to the function circuits which are controlled by the function position as hereinafter described. Each function position corresponds to a function performed within the calculating machine and is connected to the function circuits which perform the function.

The functions controlled by the function positions are:

| | |
|---|---|
| F0—display or wait | F4—subtract |
| F1—clear | F5—divide |
| F2—index | F6—not used |
| F3—add | F7—multiply |

A timer circuit 12, which is a seven-position Johnson ring circuit is internally interconnected to have 13 count stages which are labeled in order of ascending count stages T0, TD, T1, T2, T3, T4, T5, T6, T7, T8, T9, T10, T11. The timer circuit 12 is driven continuously by P9 pulses from the input decade 2 so that the count state outputs are sequentially and continuously generated and each count state output lasts from the back of the P9 pulse to the back edge of the next P9 pulse.

A visual display 14 includes 10 number tube circuits each having a number tube 16 and 10 decimal point neon bulbs 17. The anodes of the number tubes 16 are connected in sequence to a positive potential under the control of the outputs T10 to T1 respectively of the timer circuit 12. The highest significant digit in a displayed number is positioned in the left-hand number tube, which is controlled by the output T10.

One connection to each of the neon bulbs 17 is connected together and these are connected to the output TD of the timer circuit 12. The cathodes of the 10 number tubes 16 which are shaped to the same digit are connected together. The other connection of the neon bulb 17 at the left-hand side of FIG. 1 is connected to the bunched cathode connections showing the digit zero, the other connection of the next neon bulb being connected to the bunched cathode connections showing the digit one and so on until the other connection of the 10th neon bulb 17 is connected to the bunched cathode connections showing the digit 9.

The 10 bunched cathode connections are connected to the outputs of a row of bistables which form a staticiser 18. The inputs of the staticiser 18 are connected to the outputs of a buffer 20 in form of a decade counter which is internally interconnected so as to convert a train of pulses into the binary-coded decimal equivalent which appears on the output of the decade counter. The input of the buffer 20 is connected by a highway HW8 to the output of a set of gates 22.

When the output F0 of the function counter 10 is energized, i.e., at the "display" function position, the contents of the buffer 20 is cleared from the buffer 20 into the staticiser 18 at the front edge of each P0 pulse and the staticiser 18 is cleared, i.e., the digit zero line is energized, at the back edge of each P9 pulse. The buffer 20 has an output B0 which is energized, i.e., goes to a positive potential, when the buffer 20 stores a digit 0, so that the number cleared from the buffer 20 stays in the staticiser 18 for nearly the duration of an output from the timer circuit 12. The buffer output B0 is connected to an inverter circuit 20a to produce an inverted output $\overline{B0}$.

The number tube 16 connected to the output T2 of the timer circuit 12 displays the units digits, the number tube 16 connected to the output T3 displays the tens digit and so on. The position of the decimal point is given by a train of pulses loaded into the buffer 20 when the output TD of the timer circuit 12 is energized and is entered into the staticiser 18 and is displayed by the neon bulb 17 at the position corresponding to the number of pulses in the train, when the next output T1 of the timer circuit is energized. Similarly, if, for example, the digit 4 is to be displayed at the tens position, a train of four pulses is entered into the buffer 20 when the output T2 of the timer circuit is energized and the binary-coded-decimal equivalent of the digit 4 appears on the output of the buffer 20. This binary-coded-decimal output is transferred from the buffer 20 to the staticiser 18 at the pulse P0 and the digit four is displayed on that number tube 16 which is switched on when the output T3 of the timer circuit 12 is energized. The digit 4 is cleared from the staticiser 18 when the pulse P9 occurs at the end of the time in which the output T3 is energized. The frequency at which the outputs from the timer circuit 12 are energized are such that the digits appearing on the number tubes 16 and the decimal point appearing on a neon bulb 17 appear to be stationary because of the persistance effect of ocular vision.

An input register 24 has four shift registers 25a, 25b, 25c, and 25d each having 12 digit stages. The input and output of the four shift register 25a, 26b and 25d are each connected in a loop with a shift register buffer 26 in the form of four bistable circuits which are internally interconnected to form a decade counter and which act as the 13th digit stage. The shift pulse input to four shift registers 25a, 25b, 25c and 25d and the shift register buffer 26 are connected by a highway HW15 to a set of gates 34.

The set of gates 34 provide shift pulses dP9 to the four shift registers, 25a, 25b, 25c and 25d and to the shift register buffer 26 so that the binary-coded-decimal digits in the four shift registers circulate through the shift register buffer 26 and back to the input of the shift registers respectively.

A bistable circuit of the shift register buffer 26 has a carry pulse output which is energized when the digit in the shift register buffer 26 goes from the count of nine to the count of zero. The carry pulse output is connected to the input of a carry store 28. The carry store 28 comprises a first bistable circuit 30 having the outputs C01 and $\overline{C01}$ and a second bistable circuit 32 having the output CP01. The "set" connections from the first bistable circuit 30 and the second bistable circuit 32 respectively are connected to the carry pulse output of the shift register buffer 26. The first bistable circuit 30 is reset by a pulse P0 so that the output $\overline{C01}$ is energized i.e., is at a positive potential. A carry pulse from the shift register buffer 26 causes the output C01 to be energized. The second bistable circuit 32 is reset by a pulse P5, so that the output CP01 is not energized until a carry pulse is received from the shift register buffer 26. A set of gates 36, are connected by a highway HW5 to the input of the shift register buffer 26.

An accumulator register 38 has four 12-stage shift registers 39a, 39b, 39c and 39d, a shift register buffer 40 and a carry store 42 as previously described for input register 24. The shift pulse inputs of the four shift register 39a, 39b, 39c and 39d and the shift register buffer 40 are connected by a highway HW16 to a set of gates 48. The carry pulse output of the shift register buffer 40 is connected to the 'set' input of the carry store 42 which comprises a first bistable circuit 44 having the outputs C02 and $\overline{C02}$ and a second bistable circuit 46 having an output CP02. The first bistable circuit 44 is reset by a pulse P0 so that the output $\overline{C02}$ is energized and the second bistable circuit is reset by a pulse P5 so that the output is not energized until a carry pulse is received from the shift register buffer 40. The shift register buffer 40 is connected by a highway HW1 to a set of gates 50.

Thus in the input register 24 and the accumulator register 38 the shift registers and the shift register buffers form 13-stage loops around which pulse patterns circulate in synchronism with the energized outputs of the timer circuit 12. If the input register 24 or accumulator register 38 receives 13 shift pulses, the digit in the units or T1 digit stage of the input register 24 or accumulator register 38 is in the shift register buffer 26 or 40 respectively when the output T1 of the timer circuit 12 is energized. Similarly the tens or T2 digit stage of the input register 24 or accumulator register 38 is in the shift register buffer 26 or 40 respectively when the output T2 of the timer circuit 12 is energized, and so on.

If one shift pulse to a register is supressed, so that the register only receives 12 shift pulses, the number in the register is moved one place to the left with respect to the outputs of the timer circuit 12.

If an extra shift pulse is gated into a register with the pulse P5, the number in the register is moved one place to the right with respect to the outputs of the timer circuit 12.

A slip counter 52, which is a four-bistable ripple-through counter internally interconnected to have 13 count states which are labeled in ascending order of count state S0, SD, S1 ... S11, has outputs connected to the S0 and S11 count states. The outputs to the count states S0 and S11 are connected to inverter circuits 52a and 52b respectively to give the outputs $\overline{S0}$ and $\overline{S11}$. The outputs S11, $\overline{S11}$ and $\overline{S0}$ are used to control logic circuit gates. The input of the slip counter 52 is connected by a highway HW6 to a set of gates 54. The slip counter 52 is driven by P9 pulses to maintain its energized count states in correspondence with the energized count state outputs of the timer circuit 12. Shift pulses are supressed or extra ones gated in through the set of gates 54. The main purpose of the slip counter 52 is to keep a record of the amount of slip with respect of the timer circuit 12, which occurs when a number is shifted in the input register 24 or the accumulator register 38.

A decimal counter 56, which is a four-bistable ripple-through counter internally interconnected so as to have 10 count states, has its output connected to the set input of an output bistable circuit 60. The input of the decimal counter 56 is connected by a highway HW9 to a set of gates 58. The output bistable circuit 60 has the outputs D0 and $\overline{D0}$. The output bistable circuit 60 is arranged so that the output D0 is energized when the count in the decade counter 56 goes to or passes through the zero count state; the output bistable circuit 60 is reset so that the out $\overline{D0}$ is energized by the next P0 pulse.

The decimal counter 56 holds the count corresponding to the position of the decimal point digit of a number stored in the accumulator register 38. This decimal point digit is held separately from the other digits in the accumulator register 38 because the accumulator register is used for calculation of products and quotients and the whole accumulator register 38 is required for holding partial products or partial remainders during the calculation. The decimal point digit is also held separately because the answer in the accumulator register 38 may need to be repositioned so as to display the most significant digit of the answer in the left-hand number tube 16 of the visual display 14, and this is more easily done if the decimal point digit is held separately.

A bistable circuit 62 having the outputs A and $\overline{A}$ has the input connected by a highway HW13 to a set of gates 64. A bistable circuit 66 having the outputs C and $\overline{C}$ has the input connected by highway HW7 to a set of gates 68, while a bistable circuit 70 having outputs D and $\overline{D}$ has the input connected by a highway HW11 to a set of gates 72. A bistable circuit 74 having outputs E and $\overline{E}$ has the input connected by a highway HW12 to a set of gates 76. A bistable circuit 78 having the outputs H and $\overline{H}$ has the input connected by a highway HW14 to a set of gates 80.

The bistable circuit 62 controls which register has its number displayed by the visual display 14; if the bistable circuit 62 is set so that output A is energized, the number stored in the input register 24 is displayed; if the bistable circuit 62 is set so that the output $\overline{A}$ is energized, the number stored in the accumulator register 38 is displayed.

The bistable circuit 66 controls the time at which the input register can shift with respect to the accumulator register so that the four basic arithmetic functions can be performed by the calculating machine. If the bistable circuit 66 is set so that the output C is energized, shift between the registers, can take place; if the bistable circuit 66 is reset so that the output $\overline{C}$ is energized the registers are held so that shift cannot take place.

The bistable circuit 70 together with the bistable circuit 66 controls the number of shift pulses sent through the set of gates 34 and 48 to the input register 24 and the accumulator register 38 respectively.

The bistable circuit 74 has a control function which occurs during a multiplication operation.

The bistable circuit 78 has a control function which occurs if the number stored in the accumulator register 38 becomes negative during an addition, subtraction or display operation.

Figure 2:
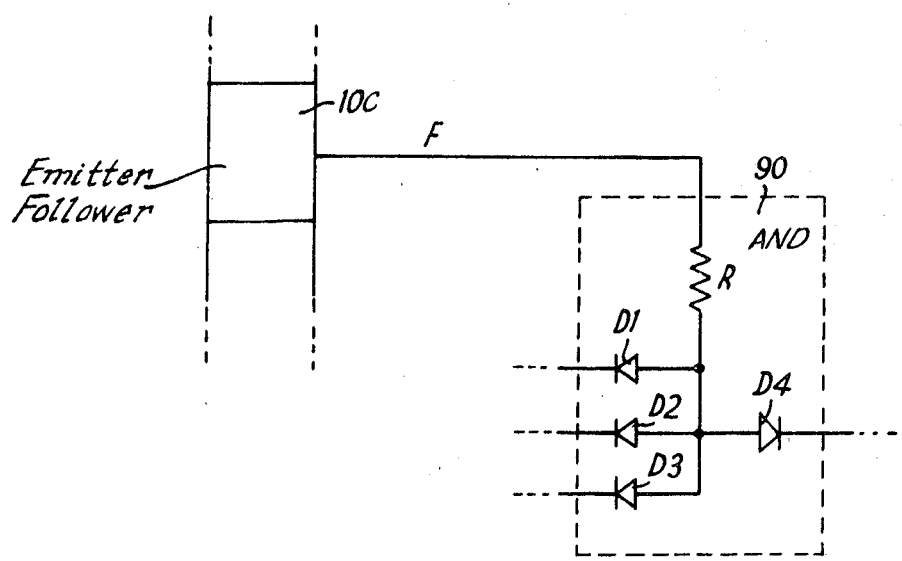
FIG. 2 shows a gate of one of the set of gates shown in FIG. 1 in greater detail.

The FIG. 2 shows a gating circuit in the form of an AND-logic-gate 90. The operation of the logic gate 90 is controlled by a source of potential supplied by the function position F through one of the emitter followers 10c. The AND-gate 90 is typical of the AND-gate logic gates in the sets of gates previously described. The output of the emitter follower 10c is zero volts at the 'off' state and +20 volts at the 'on' state and this output is applied through a resistor R of resistance 39,000 ohms to the diodes D1, D2, D3 and D4. When the function position F is not energized, the emitter follower 10c applies a potential of 0 volts to the diodes D1 to D4 through the resistor R so that the diodes D1 to D4 are reverse biased to cause the gate 90 operate the input and output circuits (not shown) which the diodes D1 to D3 and the diode D4 respectively are connected. When the function position F is energized, the emitter follower 10c applies a potential of 20 volts to the diodes D1 to D4 through the resistor R so that the diodes D1 to D4 are forward biased and the normal AND gate action, which requires the simultaneous application of a positive potential to the diodes D1, D2 and D3 for the AND gate to operate, can be performed.

Figure 3:
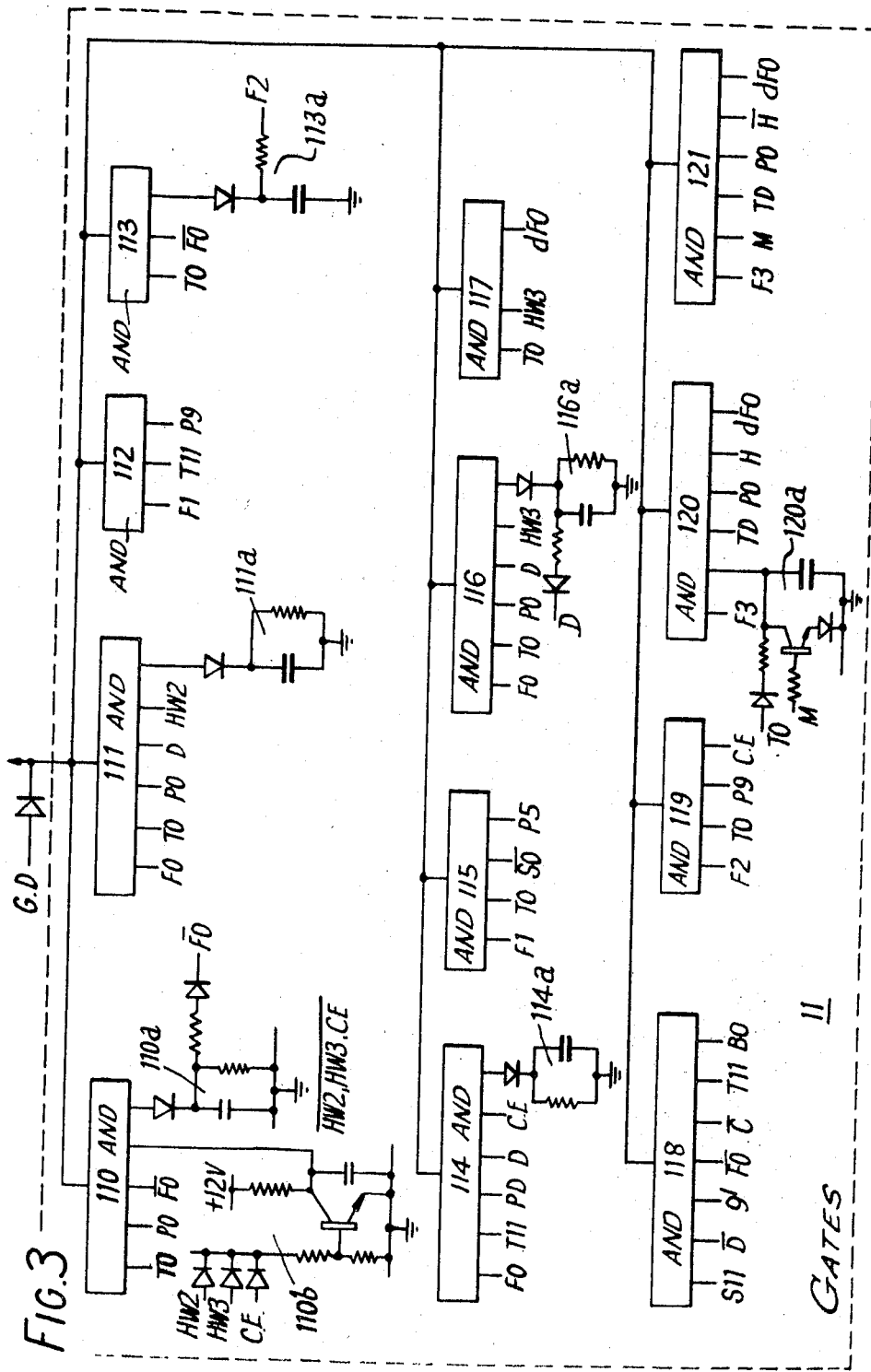
FIG. 3 shows the set of gates 11 shown in FIG. 1a in greater detail.

The FIG. 3 shows in detail the first set of gates 11 shown in FIG. 1a. The AND-logic-gates 110 to 121 shown as rectangles in the Figures are in the form of the gate 90 shown in the dotted rectangle in FIGS. 2. The 10-millisecond delay circuits 111a, 114a and 116a are connected to an input of the gates 111, 114 and 116 respectively. These delay circuits operate by being charged to a potential by the output of the emitter follower 10c through the resistor R. The delay circuit 113a delays the application of the function position F2 to the gate 113. The NPN-transistor circuit 120a is a delay circuit having two time constants: when the transistor is not conducting, the time constant is too long for the gate 120 to be opened; when the transistor is conducting on the application of the minus signal M, the time constant is short enough for the gate 120 to be opened. The circuit 110a is a one-quarter second delay circuit. The circuit 110b is an NPN-transistor inverter circuit with an OR logic gate connected to the base connection of the transistor.

The function circuits in the form of other sets of gates shown as rectangles in the FIG. 1 contain AND logic circuit gates similar to the circuit gate shown in FIG. 2, and other circuits similar to the circuits shown in FIG. 3. The sets of gates are interconnected with the function counter circuit 10 and other sets of gates so that numbers can be entered into the input register 24 and the accumulator register 38 through the digit keyboard 5, which numbers are used to perform arithmetic calculations selected from those on the function keyboard 8.

The function positions of the function counter circuit 10 operates as follows:

The display or waiting function position F0 is energized after a delay of one-quarter second by the gate 110, when the calculating machine is switched on, so that the contents of the input register 24 or the accumulator register 38 are displayed according to which of the outputs A or $\overline{A}$ of the bistable circuit 62 is energized. The function position F0 is energized also at the end of a function cycle signalled from the digit keyboard 5 or the function keyboard 8.

The clear function position F1 clears the number in the input register 24 or the accumulator register 38 according to the inputs on the gates controlled by this position.

The enter function position F2 enters digits transmitted along the highway HW2 from the digit keyboard 5 into the input register 24.

One function position F3, F4, F5 or F7 is energized when the arithmetic operation of addition, subtraction, division or multiplication respectively, is signalled by pulses transmitted along the highway HW3 from the function keyboard 8.

The calculating machine can perform the following routines or subroutines:

When the calculating machine is switched on, the function position F0 is energized after a delay of one-quarter of a second by the gate 110.

If the 'enter' key on the function keyboard 8 is depressed immediately after switch-on the 'clear and enter' signal CE is switched from 0 volts to +12 volts and the gate 114 pulses, the function counter 10 so that after a delay of 10 milliseconds to allow for key bounce, the function position F1 is energized and the number in the accumulator register 38 is cleared while the number in the input register 24 is circulated. The gate 112 pulses the function counter 10 so that the function position F2 is energized and the gate 119 pulses the function counter 10 so that the function position F3 is energized. The number in the input register 24 is added to the number in the accumulator register 38 and the resultant in the accumulator register is copied into the input register. The gate 118 pulses the function counter 10 so that the function position F0 is energized.

The operation of the first index key causes the generation of trains of first index pulses along the highway HW2. A train of first index pulses is entered into the input register 24. The generation of the trains of first index pulses causes the input register 24 to be cleared before entry of a train of first index pulses into the input register 24. The trains of first index pulses cause the gate 111, after a delay of 10 milliseconds for key bounce, to pulse the function counter 10 so that the function position F1 is energized and the number in the input register 24 is cleared. The gate 112 then pulses the function counter 10 so that the function position F2 is energized and the first index digit is entered into the input register 24. The gate 113 pulses the function counter 10 so that the function position F0 is energized and the first index digit is displayed on the visual display 14.

The operation of the second index key causes the generation of trains of second index pulses along the highway HW2. The entry of the train of second index pulses follows a similar sequence of operations to the entry of the train of first index pulses except that, as a result of the entry of the first digit, the output of the slip counter 52 is moved on by one output so that the gate 115 is energized almost immediately after the gate 111.

The gate 115 pulses the function counter 10 so that the function position F2 is energized almost immediately after the function position F1 has been energized. Because of the earlier operation of gate 115, the gate 112 is not energized and the input register 24 is not cleared by the function position F1 for the entry of the second train of index pulses. Because of the operation of the slip counter as a result of the entry of the first train of index pulses, the second train of pulses is entered into an immediately lower stage of the input register 24. The operation of the third and subsequent index keys are similar to the operation of the second index key, the trains of index pulses are entered into successive stages of the input register 24.

If the 'enter' key on the function keyboard 8 is depressed after the indexing operation has entered a number into the input register 24, the number in the input register 24 is copied into the accumulator register 38. The gate 114, 112, 119 and 118 are operated as described for the previous operation of the 'enter' key. If a further indexing operation is performed, the first number remains in the accumulator register 38 and the second number is entered into the input register 24, so that an arithmetic operation can be performed using the first and second numbers.

When a function key is depressed on the function keyboard 8, an arithmetic operation is signalled by a train of pulse signals corresponding to the arithmetic function which are transmitted along the highway HW3. The gate 116 pulses the function counter 10 off the energized function output F0 after a 10-millisecond delay to allow for key bounce of the function key and the gate 117 pulses the function counter 10 to energize the function positions F3, F5 and F7. The subtraction function position F4 is energized by using the minus signals M, which are transmitted when the subtraction function key is depressed, to open the gate 121 so as to pulse the function counter 10 from the function position F3 to the function position F4. If the subtraction operation results in a negative answer the bistable circuit 78 is pulsed by a gate in the set of gates 80 so that the output H is energized in place of the output $\bar{H}$. The bistable circuit 78 stays with the output H energized to display a negative sign on the visual display 14, when the answer is displayed. When the output H of bistable circuit 78 is energized, if a further addition operation is signalled, the gate 120 pulses the function counter 10 so that the subtraction function position F4 is energized; and if a further subtraction operation is signalled, the gate 117 pulses the function counter so that the addition function position F3 is energized because the gate 121 is closed since the input $\bar{H}$ of the gate 121 is now energized. Thus, addition operations become subtraction operations and vice versa until the number in the accumulator register 38 goes positive and the pulse in the set of gates 80 pulses the bistable circuit 78 so the output $\bar{H}$ is energized.

In the multiplication operation the number in the accumulator register 38 is the multiplier and the number in the input register is the multiplicand. The product is stored in the accumulator register 38. The multiplication process consists of entering the tens complement of the least significant digit in the accumulator register 38 into the buffer 20. The number in the input register 24 is added into the accumulator register 38 and on each addition the number in the buffer 20 is increased by one increment. When the buffer 20 reaches the zero count state, i.e., B0 is energized, after a number of additions equal to the least significant figure originally in the accumulator register, the input register 24 shifts one place to left and the tens complement of the next highest significant digit of the number in the accumulator register 38 is entered into the buffer 20.

This sequence is repeated until the product has been built up in the accumulation register 38 by successive addition of partial products. At the end of the multiplication operation the decimal point position of the product is calculated by adding the multiplicand decimal point count to the multiplier decimal point count stored in the decimal point counter 56.

If the highest significant figure of the product or partial product spills into the T11 digit stage of the accumulator, when the T11 digit stage is energized, the signal B0 and the signal C02 are together energized so that a gate in the set of gates 76 is energized to pulse the bistable circuit 74 so as to energize the output $\bar{E}$. The output $\bar{E}$ is an input to a gate of the set of gates 48, and as a result of the energizing of output $\bar{E}$ by the gate in the set of gates 76, the gate in the set of gates 48 passes the 14th shift pulse to the accumulator register 38 to cause the accumulator register to shift one digit stage to the right so that the highest significant figure is moved into the T10 digit stage.

In the division operation, the number in the accumulator register 38 is the dividend and the number in the input register 24 is the divisor. The quotient is stored in the accumulator register. The division operation takes place with the input register shifted to the right with respect to the accumulator. The division process consists of transferring the most significant digit of dividend (plus one) to the buffer and then successively subtracting the divisor from the dividend until the dividend goes negative. The divisor is then added back to the dividend and a right shift operation takes place. As the division operation continues the quotient is built up digit by digit from the highest significant figure of the accumulator register.

Cases of division may occur where the first digit of the divisor is some way down the input register 24 and, in this case, the calculating machine would try to calculate a first digit of quotient greater than 9 and would spill its answer to the left into the T11 digit stage of the accumulator register. This case is guarded against by having a condition in the division routine that the first quotient digit is 0. (This digit is held at T11 and is not displayed.) The first digit of dividend held at T11 is 0, therefore, the first subtraction of the divisor should drive the buffer 20 to 0 (so that the output B0 is energized) if the above condition is satisfied. If the condition is not satisfied then a gate in the set of gates 48 is energized to add an extra, 14th, shift pulse at P5 to shift the accumulator register 38 to the right and the division routine begins again. Eventually the first quotient digit will be 0 and the division process proper can continue. At the end of the division operation the decimal point position of the quotient is calculated by subtracting the divisor decimal point count from the dividend decimal point count stored in the decimal point counter 56.

In the addition operation, the number in the input register 24 is added to the number in the accumulator register 38. The answer is displayed in the accumulator register. The numbers are aligned before addition by relative shifting of the input and accumulator registers by a number of shifts equal to the difference between the decimal point count.

If, when the numbers are added together, there is a carry into the T11 stage of the accumulator, the output CP02 of the carry store is energized to T11. A gate in the set of gates 48 is energized to pass a P5 pulse as the 14th shift pulse to the accumulator register so as to cause the accumulator register 38 to shift one digit stage to the right with respect to the timer circuit 12. A gate in the set of gates 58 is energized to pass a P0 pulse to the decimal point counter 56 to move the decimal point one space to the right.

The subtraction operation is similar to the addition operation and is done by the usual method of complementary addition. The right shift operation for the subtraction operation is identical with the right shift operation previously described for the addition operation.

The answer to a calculation is stored in and circulates around the accumulator register 38 and is displayed when the inputs marked F0 on gates are energized. A digit is shifted into the shift register buffer 40 of the accumulator register 38 by a dP9 pulse which occurs at the same time as the next output of the timer circuit 12 is energized. A gate in the set of gates 50 is energized for the outputs T1, TD and T2 to T10 of the timer circuit 12 and allows 10 oscillator GD pulses (corresponding to the pulses P0 to P9) to circulate the digit in the shift register buffer 40. At the same time a gate in the set of gates 22 is shut (since the first bistable circuit 44 was reset by the first pulse P0) and does not allow oscillator GD pulses to pass into the buffer 20. When the digit in the shift register buffer 40 goes through 0, a pulse is passed to the first bistable circuit 44 and the second bistable 46 so that the outputs C02 and CP02 are energized. When the input C02 is energized the gate in the set of gates 22 allows a number of oscillator pulses GD equal to the digit in the first register buffer 40 to enter the buffer 20. As previously described, the digit in the buffer 20 is cleared into the staticiser 18 at the next P0 pulse (which also resets the first bistable circuit 44) and the digit is displayed on the visual display 14.

The function positions of the function counter circuit 10 may control arithmetic operations, program routines or subroutines other than those described.

The function counter circuit 10 may have any number of count states.

The circuitry associated with the function counter circuit 10 may be so modified that the pulse count stored in the counter circuit can step from any count state directly to any other count state.

What is claimed is:

1. An electronic calculating machine comprising a plurality of function circuits for performing a plurality of calculating functions and apparatus for controlling the operation of said function circuits of the calculating machine, said apparatus including a function counter circuit having an input for receiving count pulses and a plurality of output count states each with an output circuit, a source of function pulses, input gating circuits connected to the input of the counter to gate pulses for counting said counter circuit connected to said source of function pulses to thereby gate function pulses and cause said counter to attain a predetermined count state in response to the gated function pulses, function keys connected to the source of function pulses for controlling the function pulses coupled from said source of function pulses to said gating circuits, and control circuits operable from said counter connecting outputs from said counter states to respective said function circuits to attain predetermined calculating functions for each counter state with corresponding ones of the function circuits.

2. A calculating machine according to claim 1, wherein said gating circuits include a first set of gate circuits, the outputs of said first set of gate circuits being connected to the input of the counter circuit, inputs of said set of gate circuits being connected to said source of function pulses, and to at least one said output state circuit of the counter circuit so that, when a gate circuit in the first set of gate circuits is energized to apply a pulse input of at least one pulse to said input of said counter circuit, the counter circuit counts the pulse input so as to move the energized count state by a number of count states equal to the number of pulses in the pulse input.

3. A calculating machine according to claim 1, wherein said gating circuits include several sets of gates, each connected to gate pulses to said counter input and each having an output of said counter circuit connected thereto so as to operate the gate; whereby, when a predetermined count state is energized, the set of gates connected to the energized count state outputs operates to gate signals and the set of gates connected to the nonenergized count state outputs cannot gate signals.

4. A calculating machine according to claim 1, wherein said gating circuits include a plurality of sets of gate circuits each having an input circuit responsive to an output state of said counter and each having an output circuit connected to gate pulses to said counter input.

5. A calculating machine according to claim 1, including circuit means with buffer circuits, wherein the outputs from the count states of the counter circuit are connected to the inputs of the buffer circuits respectively and the outputs of the buffer circuits are connected to the function circuits.

6. A calculating machine according to claim 1, wherein said source of function pulses comprises a master oscillator providing timing pulses, an input decade counter with 10 outputs which is connected to receive output pulses from said oscillator to divide the oscillator pulses into a sequence of trains of 10 pulses which appear respectively on said 10 outputs of the input decade counter, a function keyboard including a plurality of said function keys each having two connections, each of the function keys being connected by one said connection to one respective output of said input decade counter, a function gate circuit in said input gating circuits with an input connected to the other connection of the function keys, a function highway line connecting an output from the function keys to at least one input of said input gating circuits connected to the input of the counter circuit, and pulse duration forming circuits providing when one said function key is operated, the corresponding output of said input decade counter to said function gate circuit transmitting along said function highway line a function signal output of duration proportional to the position of the pulses of the corresponding output of the input decade counter.

7. A calculating machine according to claim 6, wherein the function signal output transmitted from said function gating circuit is a single pulse beginning at a reset pulse and ending at the pulse from the corresponding output of the input decade counter.

8. A calculating machine according to claim 6, wherein said function keyboard includes at least some keys each of which is connected by one connection to a source of potential and other connection to inputs of the set of gates connected to the input of the counter circuit.

9. A calculating machine according to claim 6, including counter reset means providing a reset pulse to said function counter and including means to transmit the function signal output from said function gating circuit as a train of pulses of number proportional to the position of the pulses of the corresponding output of the input decade counter from said reset pulse.

10. A calculating machine according to claim 9, wherein the calculating machine includes a digit keyboard including a plurality of digit keys having two connections and representing the digits 0 to 9, one circuit connection of each of the plurality of digit keys is connected to the outputs of the input decade counter respectively, said means to transmit the function signal comprising a circuit connecting the input of the digit gate to the other connections of the digit keys, an output digit highway line connected to at least one input of said input gating circuits connected to the input of the function counter and further circuits connected so that when a digit key is operated, the output of the input decade counter connected to the digit key is transmitted by a digit signal of duration proportional to the digit represented by the operated digit key.

11. A calculating machine according to claim 10, including circuit means providing that said digit signal is a train of pulses.

12. A calculating machine according to claim 10, including circuit means providing that said digit signal output transmitted from the digit gating circuit is a single pulse.

* * * * *